United States Patent
Hargett, Jr. et al.

(10) Patent No.: US 7,829,040 B2
(45) Date of Patent: Nov. 9, 2010

(54) HIGH TEMPERATURE HIGH PRESSURE VESSEL FOR MICROWAVE ASSISTED CHEMISTRY

(75) Inventors: Wyatt Hargett, Jr., Matthews, NC (US); David Barclay, Charlotte, NC (US)

(73) Assignee: CEM Corporation, Matthews, NC (US)

( * ) Notice: Subject to any disclaimer, the term of this patent is extended or adjusted under 35 U.S.C. 154(b) by 0 days.

(21) Appl. No.: 12/398,353

(22) Filed: Mar. 5, 2009

(65) Prior Publication Data

US 2010/0227413 A1    Sep. 9, 2010

(51) Int. Cl.
*B01J 3/00* (2006.01)

(52) U.S. Cl. .................. 422/242; 422/117; 422/118; 422/99; 422/102; 422/104; 436/174; 436/175

(58) Field of Classification Search .............. None
See application file for complete search history.

(56) References Cited

U.S. PATENT DOCUMENTS

| | | | |
|---|---|---|---|
| 4,882,128 A | 11/1989 | Hukvari et al. | |
| 4,933,529 A | 6/1990 | Saville | |
| 4,996,027 A * | 2/1991 | Kanner | 422/113 |
| 5,230,865 A | 7/1993 | Hargett et al. | |
| 5,236,669 A | 8/1993 | Simmons et al. | |
| 5,270,010 A | 12/1993 | Lautenschlager | |
| 5,369,034 A * | 11/1994 | Hargett et al. | 436/155 |
| 5,427,741 A | 6/1995 | Bennett | |
| 5,520,886 A | 5/1996 | Bennett et al. | |
| 5,948,307 A | 9/1999 | Stalling | |
| 6,097,015 A | 8/2000 | McCullough et al. | |
| 6,124,582 A | 9/2000 | Thomas et al. | |
| 6,136,276 A | 10/2000 | Hargett, Jr. et al. | |
| 6,177,054 B1 | 1/2001 | Bartels | |
| 6,258,329 B1 | 7/2001 | Mutterer, Jr. et al. | |
| 6,287,526 B1 | 9/2001 | Hargett, Jr. | |
| 6,863,871 B2 * | 3/2005 | Hargett, Jr. | 422/242 |
| 6,926,939 B2 | 8/2005 | Hargett, Jr. et al. | |
| 6,927,371 B1 | 8/2005 | Hargett, Jr. et al. | |
| 2004/0179977 A1 | 9/2004 | Hargett, Jr. | |

\* cited by examiner

*Primary Examiner*—Yelena G Gakh
*Assistant Examiner*—Christopher A. Hixon
(74) *Attorney, Agent, or Firm*—Summa, Additon & Ashe, P.A.

(57) ABSTRACT

A vessel assembly is disclosed for high pressure high temperature chemistry. The vessel assembly includes a cylindrical vessel and a cylindrical vessel seal cover. The vessel and the seal cover have respective surfaces that, when engaged, define a circumferential interior passage between the vessel and the seal cover. A pressure release opening in the seal cover is in fluid communication with the circumferential passage. A retaining ring surrounds the vessel and the seal cover at the position where the vessel and the seal cover meet to maintain an outer circumferential engagement between the seal cover and the vessel when pressure forces gases in the vessel to flow into the circumferential passage and then outwardly from the pressure release opening.

13 Claims, 6 Drawing Sheets

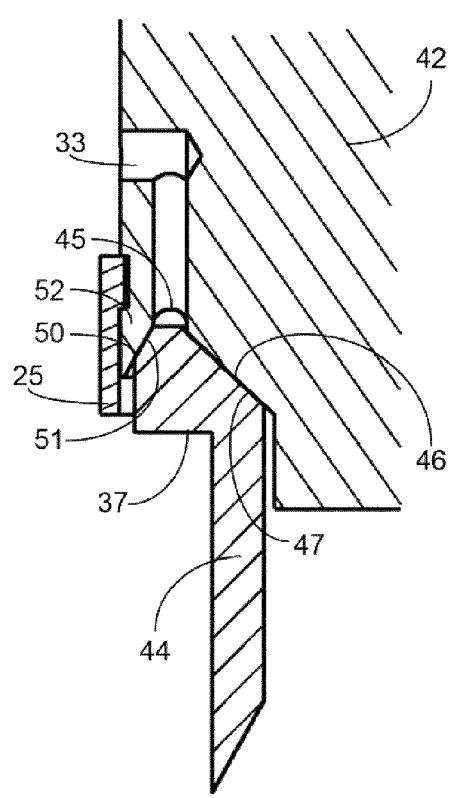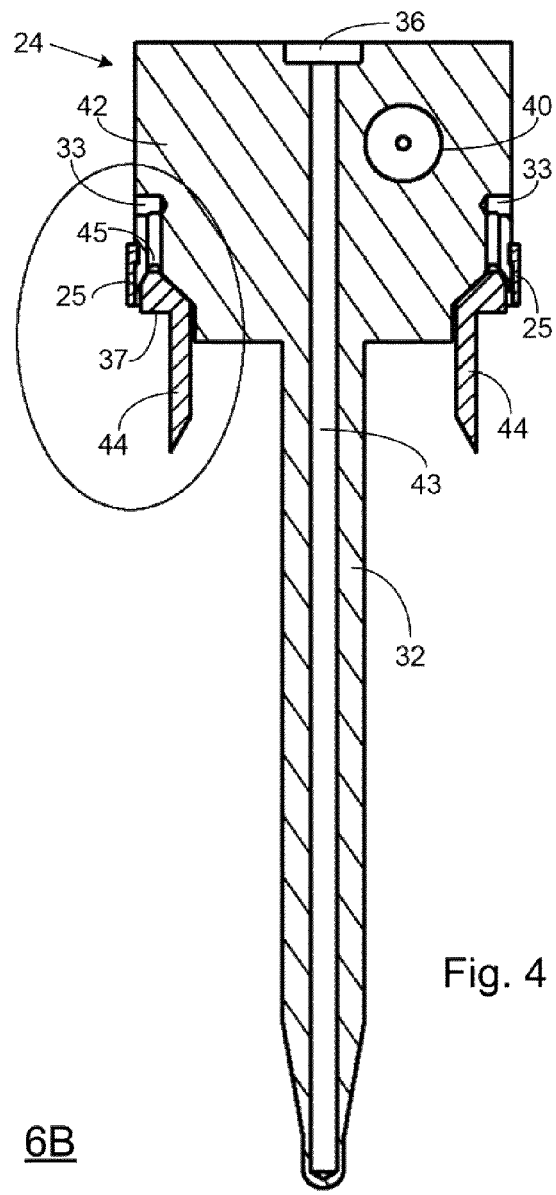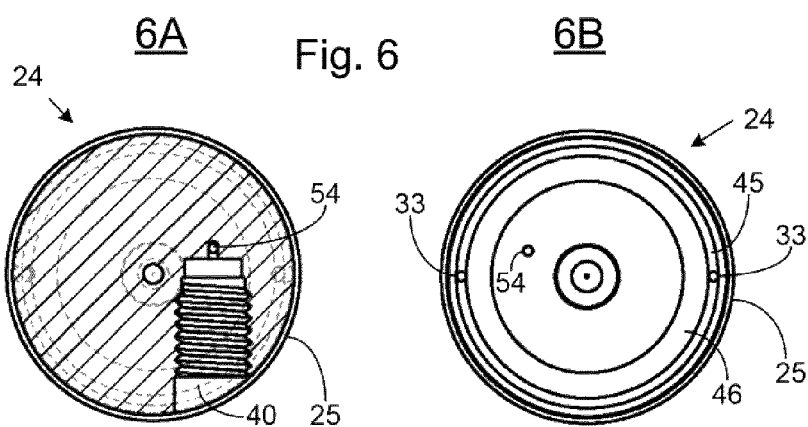

HIGH TEMPERATURE HIGH PRESSURE VESSEL FOR MICROWAVE ASSISTED CHEMISTRY

BACKGROUND

The present invention relates to vessels used for high temperature, high pressure microwave-assisted reactions, including but not limited to digestion of materials in robust solvents.

In general, the term "digestion" refers to the process of analyzing the contents of a material by dissolving that material in a solvent that reduces the compounds that make up the material into their constituent elements or more basic compounds. In such form, the elements or compounds originally present in the material (the "analytes of interest") can be identified more easily both as to their presence and their amounts. In many cases. however, the analytes of interest comprise only a small portion of the bulk of the material to be digested. As a result, the remaining unanalyzed portion of the material must be removed in order to free the analytes of interest for further analysis.

As one example, a soil sample can be analyzed for the presence of particular contaminating materials such as heavy metals by heating the sample in a strong acid that breaks down the bulk of the soil material (the matrix) and solvates the heavy metals making them available for further analysis. The resulting solution of elements can be diluted or otherwise prepared and then analyzed for content and quantity, for example using mass spectroscopy, atomic absorption spectroscopy, atomic emission spectroscopy, or other well-understood techniques.

Some materials will digest in acid at room temperature (i.e., about 20° C.). Other materials will digest when heated to moderate or somewhat elevated temperatures; e.g. 100-150° C. Other materials, however, will resist digestion until the temperature is raised to at least 200° C. and in some cases even higher.

Additionally, both the nature of digestion and in some cases the composition of the materials being tested result in chemical reactions that generate gases as part of the digestion process. These gases are commonly incidental side products of the breakdown of the matrix of the material. Conversion of the unanalyzed portion of the material to gaseous by-products can be seen as an important part of the digestion process-essentially freeing the analytes for further analysis. The solvents used to effect the digestion process are commonly liquids whose boiling points have a known relationship with temperature and pressure.

As dictated by the ideal gas law (and the more complex version of the gas laws), a gas that is heated to a higher temperature within the defined volume of such a sealed vessel will exert a correspondingly increased pressure against that vessel.

In pressurized digestion techniques the temperature of the process is elevated by carrying out the digestion in a sealed heated container. This allows the reaction to reach temperatures above the atmospheric boiling point of the digestion solvent. Increasing the temperature also increases the rate of the chemical reactions which accomplish the digestion. The digestion is thus more complete and faster as temperature is increased.

In microwave assisted digestion, in which the use of microwaves further accelerates the heating process, a sealed pressure vessel is used to contain the digestion reaction. Because metals tend to shield microwaves or cause sparking in a microwave field, microwave digestion is typically carried out in a microwave transparent vessel formed of an engineering polymer such as polyamide. At the temperatures commonly used for digestion, the pressure in the vessel is generated from two components. Vapor pressure generated by the digestion solvent(s) represents one component, and this component is predictable based upon the temperature of the solvent. The pressure of gaseous by-products generated during the digestion process represents the second component. Thus the amount of pressure in the vessel is related to both the boiling point of the solvent and also to the size and composition of the sample that is to be digested.

Because samples to be analyzed typically contain unknown amounts of material(s) that may form gaseous by-products, the resulting amount of gas pressure is unpredictable.

Microwave transparent pressure vessels are commonly made from engineered plastics that can withstand relatively high pressures before failing. The nature of polymers and plastics is such, however, that if the vessel fails under pressure, it will tend to fail catastrophically.

In order to avoid such catastrophic failure, vessels for microwave digestion have been developed that include some means for pressure release. In some cases, the pressure release is provided by a small pathway leading from the interior to the exterior of the vessel with a small portion of the pathway blocked by a diaphragm that will fail at a predetermined pressure. When the pressure in such a vessel exceeds the predetermined limit, the diaphragm will burst and the gases will vent from the vessel without any catastrophic or near-catastrophic failure.

Commonly assigned U.S. Pat. Nos. 6,258,329; 5,520,886; 5,427,741; 5,369,034 and 5,230,865 are representative of the diaphragm type of pressure release system for vessels used in microwave assisted digestion and related reactions.

Accordingly, vessels have been developed in which the pressure release is temporary rather than complete and which allow the reaction to continue during and after the pressure release. Such vessels are designed to vent a small amount of gas when the pressure in the vessel exceeds predetermined limit and to re-seal themselves when the pressure drops below the predetermined limit. Examples include commonly assigned U.S. Pat. Nos. 6,927,371; 6,287,526; 6,136,276 and 6,124,582.

Such vessels commonly operate at 180-200° C. and cannot contain sufficient pressure to allow higher temperatures to be achieved.

If these vessels are sealed in a manner that attempts to contain gas pressures generated at temperatures above 200° C. (typically by over-tightening threaded fixtures), a higher proportion of these vessels will fail.

Such failures, of course, reduce efficiency by forcing experiments to be repeated. More importantly, when such vessels are heated above 200° C. and when they release the gases at such temperatures, the release tends to permanently distort the vessel even though catastrophic failure is avoided.

Because the vessels are formed of sophisticated engineering plastics, they tend to be relatively expensive. As a result, vessel failures result in the economic loss of the vessel in addition to the loss of the particular experiment and the loss of overall efficiency of the testing being carried out.

Although the capacity to carry out a digestion in sealed pressure-releasing vessels at temperatures up to 200° C. is valuable in many circumstances, there are a number of types of materials that will not digest even at such temperatures and that must be heated significantly above 200° C. before they will digest completely. If a composition fails to digest completely, the likelihood increases that elements will be misidentified, identified in erroneous quantities, or remain completely unidentified.

For example, materials such as polymers, lubricating oils, high molecular weight compositions, compositions containing significant proportions of aromatic compounds, and refractory materials all need to be heated higher than 200° C. before they will digest properly. As an example, analyzing plastics in childrens' toy to make sure that it avoids containing undesirable (or in some cases prohibited) amounts of heavy metals or other materials requires such high-temperature digestion. The same is true for many lubricating and related oils which are widely present in a wide variety of industrial machinery as well as automobiles, trucks, trains and airplanes.

Digestion samples often contain very small amounts of the analytes of interest. The sample size which can be digested in any sealed vessel at a given temperature is thus limited by the safe operating pressure limit of the vessel. Maximizing sample size while maintaining a sufficient temperature for an effective digestion is an important aspect of the technique and increases the accuracy of the analysis Therefore, a need exists for vessels suitable for microwave assisted chemistry that can withstand higher temperatures, can contain higher pressure, and can release pressure above a predetermined limit, but while avoiding or minimizing the loss of gases that may contain materials that need to be identified and quantified and while avoiding permanent or catastrophic failure of the vessel.

SUMMARY

In one aspect the invention is a vessel assembly for high pressure high temperature chemistry. The assembly comprises a cylindrical vessel and a cylindrical vessel seal cover, with the vessel and the seal cover having respective surfaces that, when engaged, define a circumferential interior passage between the vessel and the seal cover. A pressure release opening in the seal cover is in fluid communication with the circumferential passage. A retaining ring surrounds the vessel and the seal cover at the position where the vessel and the seal cover meet for maintaining an outer circumferential engagement between the seal cover and the vessel when pressure forces gases in the vessel to flow into the circumferential passage and then outwardly from the pressure release opening.

In another aspect, the vessel assembly comprises a cylindrical vessel defining an open mouth at one end with a circumferential lip extending around and transversely from the mouth of the vessel. A seal cover engages and closes the vessel at the mouth. The lip has respective inner and outer circumferential oblique surfaces and the vessel has corresponding respective inner and outer circumferential oblique surfaces that respectively engage the oblique surfaces of the lip.

A circumferential pressure release channel is defined by the seal cover at the junction of the oblique surfaces of the seal cover and the vessel lip. At least one pressure release opening is in the seal cover in communication with the pressure release channel, and a retaining ring surrounds the seal cover at the position where the oblique surfaces of the vessel and the seal cover meet that radially urges the seal cover against the vessel lip In another aspect, the invention is a method of high pressure high temperature chemistry. In this aspect the method includes digesting a sample in a strong acid at a temperature of at least 200° C. in a pressure resistant vessel that includes a lid while exerting a defined force against the lid in order to maintain gases under pressure in the vessel, directing gas under excess pressure from the vessel into a circumferential passage defined by the vessel and its pressure resistant lid, and directing the gas from the circumferential passage outwardly from the lid while preventing gas from flowing outwardly over the edge of the vessel.

The foregoing and other objects and advantages of the invention and the manner in which the same are accomplished will become clearer based on the followed detailed description taken in conjunction with the accompanying drawings.

BRIEF DESCRIPTION OF THE DRAWINGS

FIG. 4 is a cross-sectional view of the seal cover and probe according to one embodiment of the invention.

FIG. 5 is in an enlarged cross sectional view of portions of the venting structure according to the invention FIG. 6A is a cross-sectional view of the seal cover taken along lines 6-6 of FIG. 4.

FIG. 6B is a bottom plan view of the seal cover of FIG. 6A.

DETAILED DESCRIPTION

It will be understood that although the vessels herein are described in terms of digestion chemistry, digestion chemistry is only one, albeit helpful, example of high pressure high temperature gas-generating chemistry. Thus, the vessels described and claimed herein along with their advantages can certainly be incorporated with other types of high-temperature high-pressure reactions for the same purpose and with the same advantageous results.

Figure 1:
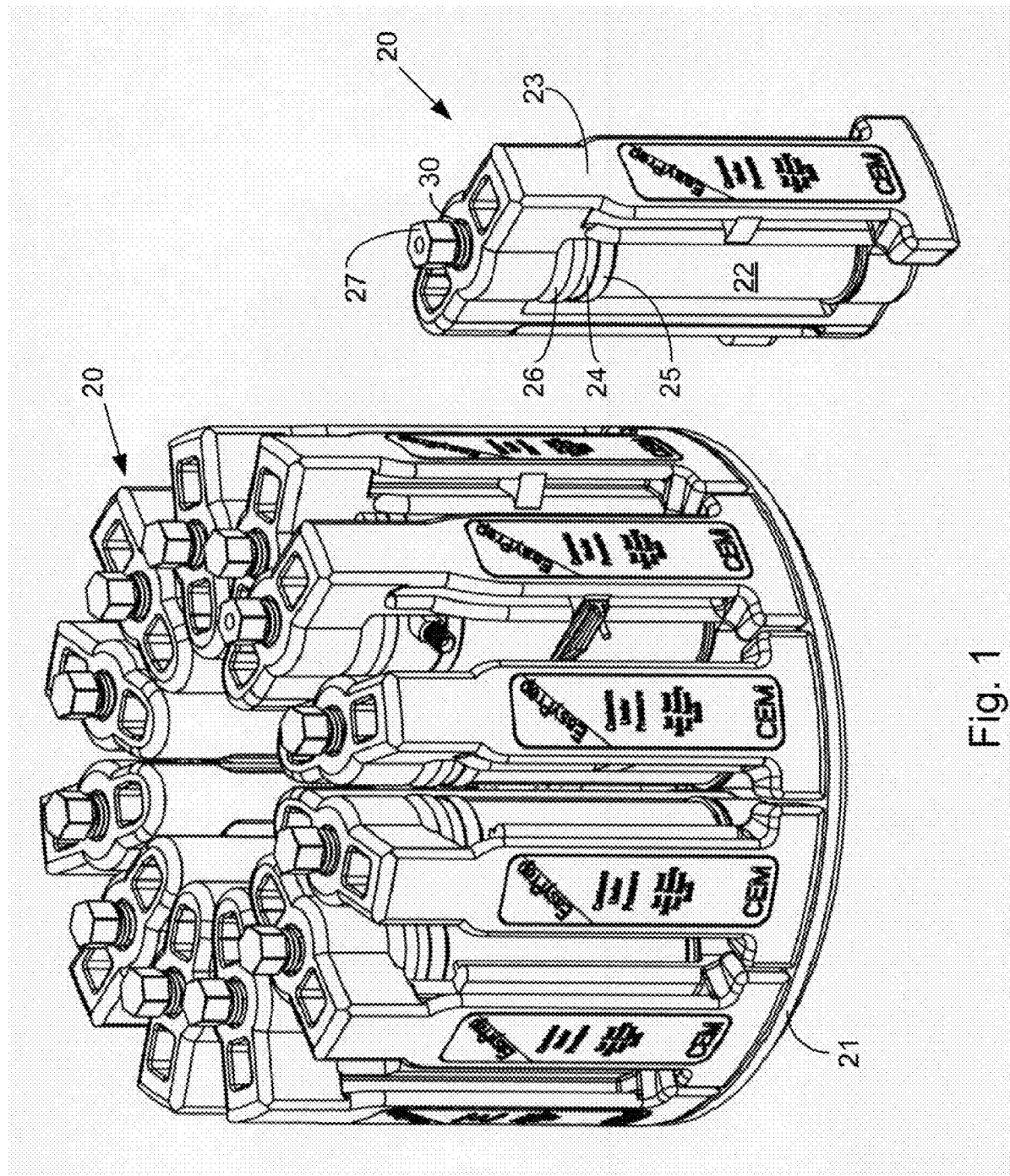
FIG. 1 is a perspective view of a plurality of vessels according to the invention as typically arranged in a microwave instrument.

FIG. 1 illustrates a plurality of pressure vessel assemblies each of which is broadly designated at 20. In an exemplary (although not limiting) arrangement, a plurality of the vessel assemblies 20 are positioned on a turntable 21 or similar platform which in turn is positioned in the cavity of a microwave instrument (not shown). FIG. 1 illustrates twelve such vessel assemblies on the turntable 21. The nature of the propagation of microwaves in instruments with microwave cavities large enough to hold this plurality of vessel assemblies makes it advantageous to move the vessels within the cavity while the microwaves are being applied. This is most commonly done using rotation in a manner generally analogous to the turntables commonly found in domestic microwave appliances used for cooking.

Each of the vessel assemblies is formed of several parts. In the embodiment illustrated in FIG. 1, the reaction vessel itself is not visible because it is typically surrounded by a cylindrical sleeve 22 which provides reinforcing support around the vessel. Although the sleeve 22 is optional, it permits the vessel to be formed of a material (typically a polymer) that is highly resistant to chemical attack, while the sleeve, being insulated from the reactants, can be selected on the basis of its strength. Woven fabrics of engineering polymers are useful for the sleeve as are fiber-reinforced polymers and combinations of these materials.

The vessel and sleeve 22 are positioned within a generally rectangular frame 23 that helps provide a pressure seal during ongoing chemical reactions. The frame is selected primarily for its strength, with cost and ease of manufacture also being considered. Thus, appropriate engineering polymers are typically used for the frame 23.

The vessel is closed with a circular seal cover 24 a portion of which is illustrated in the embodiment in FIG. 1. The lower portion of the seal cover 24 is surrounded by a circular retaining ring 25, the structure and function of which will be described with respect to the remaining figures.

A round load disk 26 with a frustoconical side profile is positioned on top of the seal cover 24 within the opening for the vessel defined by the frame 23. In the illustrated embodiment the load disk 26 operates in conjunction with a pressure screw 27 in the following manner. The pressure screw 27 is threaded and engages within a corresponding threaded opening 30 defined by the frame 23. When the screw 27 is inserted and turned in the opening 30, it applies force against the load disk 26 and in turn against the seal cover 24. Subject to the overall strength of the materials used in the vessel assembly 20, the amount of pressure exerted by the threaded screw 27 against the load disk 26 and the seal cover 24 will define the pressure load at which gases can escape from the vessel assembly. Thus, in many cases, the user can define the pressure load by tightening the screw to a desired extent.

Figure 2:
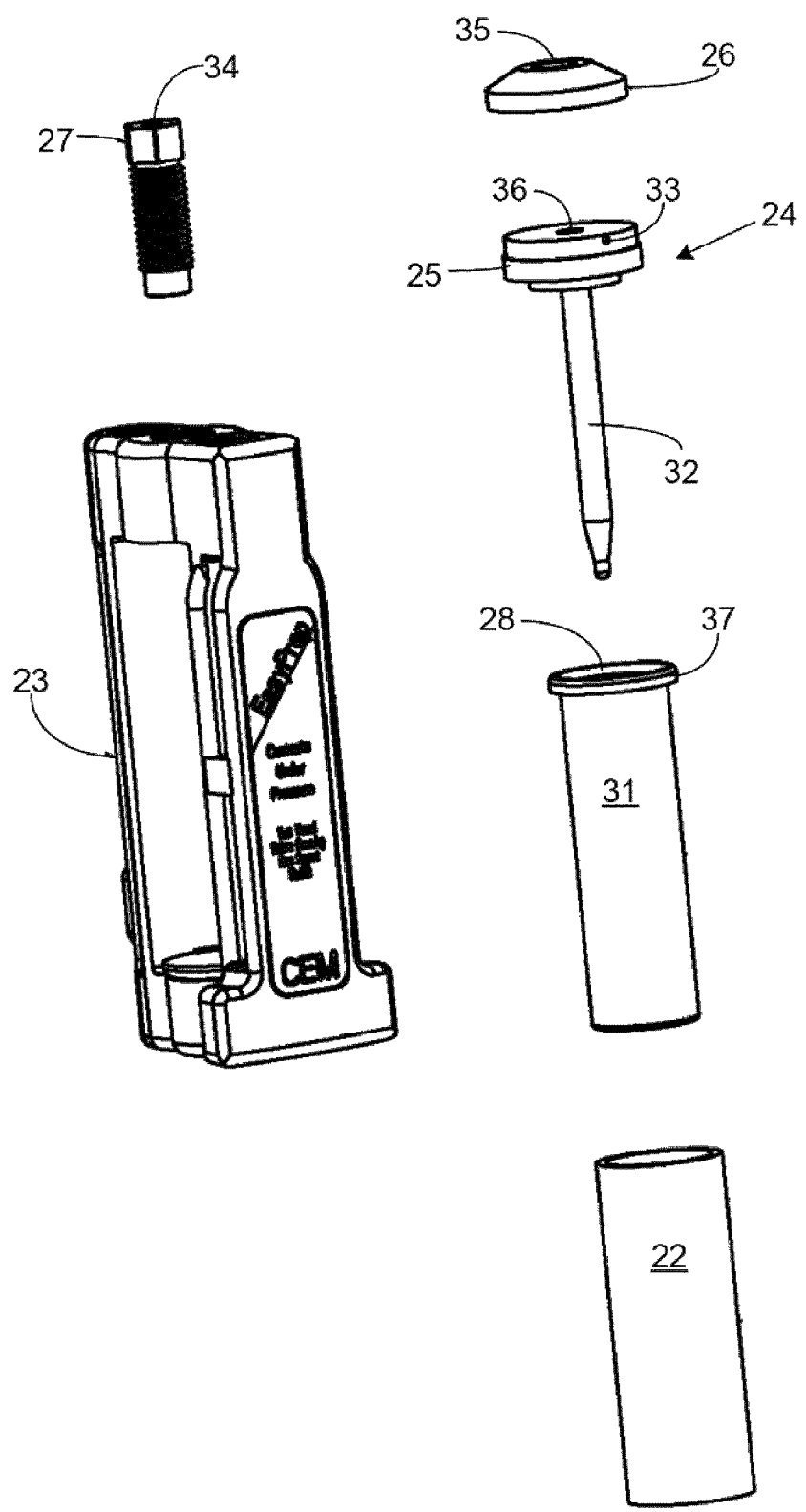
FIG. 2 is an exploded perspective view of one embodiment of a vessel according to the present invention.

FIG. 2 is an exploded perspective view in which a number of the elements are the same as in FIG. 1. These include the frame 23, the threaded screw 27, the vessel sleeve 22, and the load disk 26. The vessel 31 is cylindrical and formed of a material (PTFE is exemplary) that is both transparent to microwave radiation and resistant to attack by strong acids (e.g., nitric, sulfuric, hydrochloric) at digestion temperatures. The vessel 31 defines an open mouth 28 at one end.

FIG. 2 also, however, illustrates the vessel itself at 31 along with its relationship to the sleeve 22. The seal cover 24 is shown in a more complete view including a probe portion 32 which is hollow and cylindrical (FIG. 4) and into which a temperature measuring device can be inserted to track the temperature of the materials in the vessel during the application of microwave energy.

FIG. 2 also illustrates the circumferential retaining ring 25 in position around the seal cover 24 as well as one of the pressure release openings 33 that will be described in more detail with respect to FIGS. 4, 5 and 6.

Respective circular openings 34 in the screw 27, 35 in the load disk 26, and 36 in the seal cover 24 provide access to the probe during operation of the vessel. Because the probe is sealed, these openings can be open to atmosphere or ambient pressure conditions.

FIG. 2 also illustrates the lip 37 on the mouth 28 of the vessel 31 which will be described in more detail with respect to other drawings.

Figure 3:
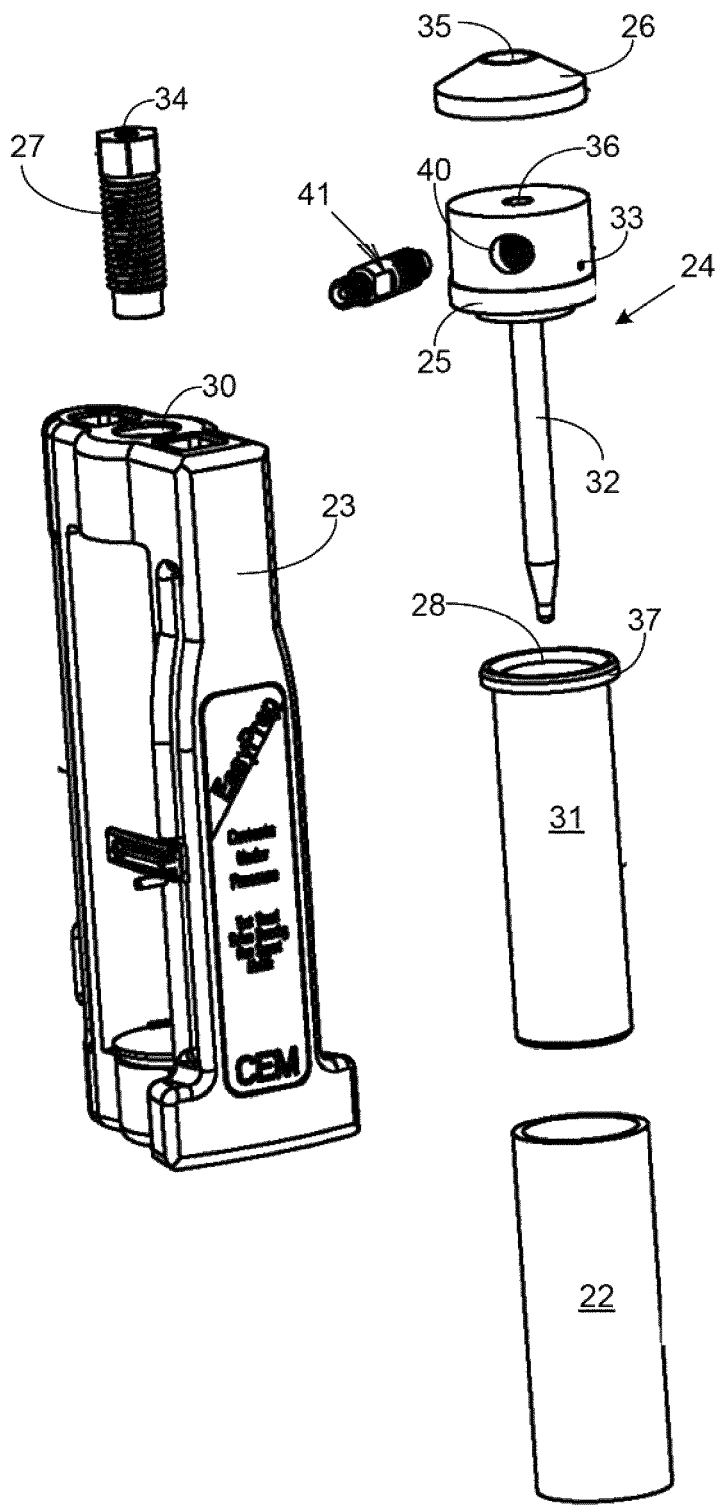
FIG. 3 is an exploded perspective view of a second embodiment of the vessel according to the present invention

FIG. 3 illustrates a second embodiment of the vessel assembly which in many respects is identical to the embodiment of FIG. 2, but with an additional fixture that permits pressure monitoring of the reactants inside the vessel 31. Thus, most of the elements illustrated in FIG. 3 carry the same reference numerals as in FIG. 2.

In the embodiment illustrated in FIG. 3, however, the seal cover 24 is somewhat larger (axially longer) than the one illustrated in FIG. 2 and includes a pressure stem seat illustrated as the threaded opening 40. In operation a pressure stem 41 is engaged in the seat 40, typically through a threaded arrangement. The pressure stem 41 can also be formed as an integral part of the seal cover 24. As will be illustrated and described with respect to FIGS. 4, 5 and 6, these items permit the pressure within the vessel 31 to be monitored during the application of microwave energy.

FIGS. 4, 5 and 6 are cross-sectional views that illustrate structural and operational details of the present invention. FIG. 4 is a cross-sectional view of the embodiment of the seal cover 24 illustrated in FIG. 3. In this embodiment, the seal cover 24 includes a head portion 42 from which extends the previously described probe portion 32. FIG. 4 illustrates the opening 43 defined by the head 42 and the probe 32 into which an appropriate temperature measurement device can be inserted.

In FIG. 4 only a small portion of the vessel 31 is illustrated and for purposes of describing the operation, the vessel walls are labeled 44 with the lip again designated at 37. As in the previous drawings, the retaining ring is illustrated at 25.

FIGS. 4 and 5 illustrate a pair of pressure release openings 33 in the head portion 42 of the seal cover 24. These openings are connected to one another within the seal cover 24 by the pressure release passage 45. Because the release openings 33 allow gas to escape, their illustrated circular cross section is exemplary rather than limiting.

Figure 10:
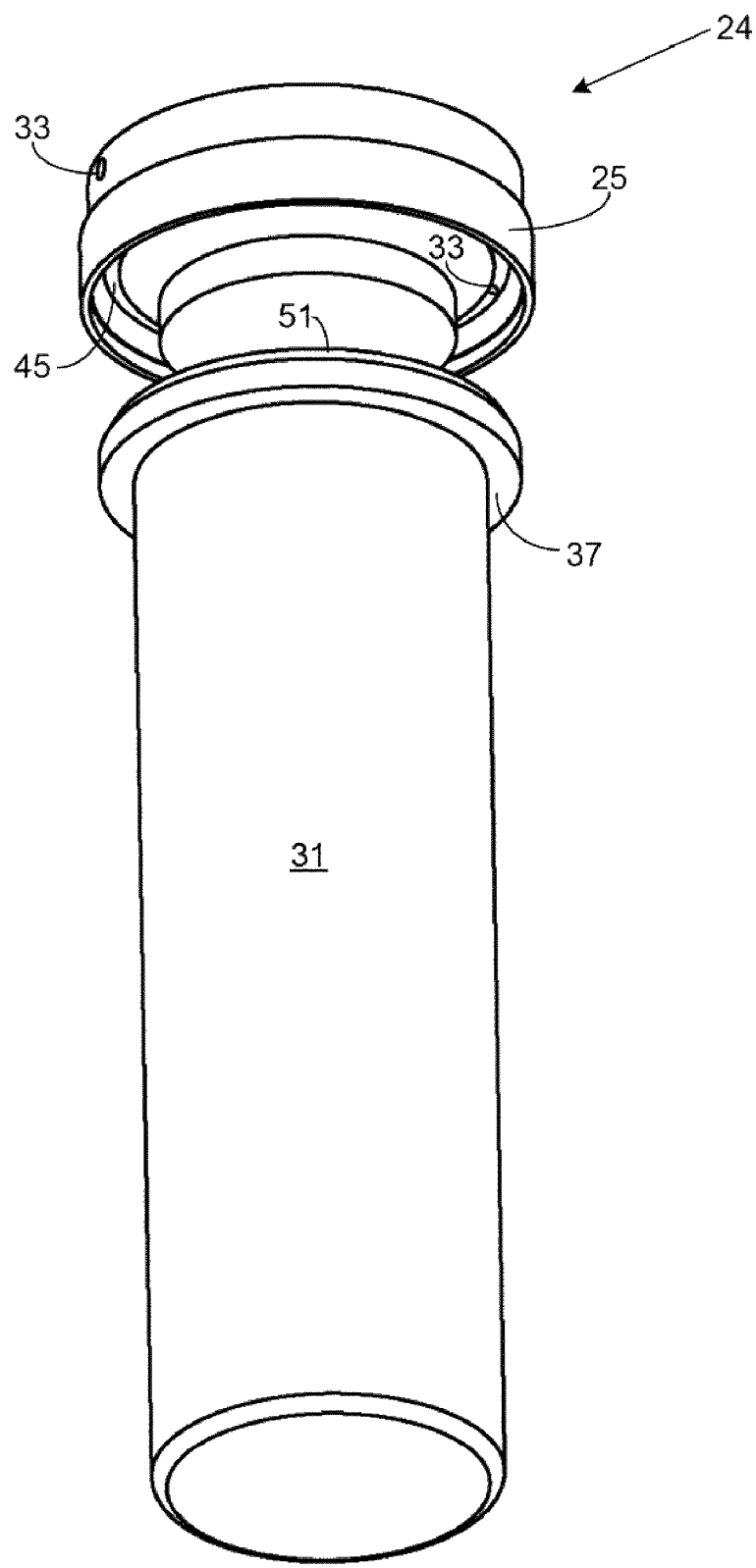
FIG. 10 is a perspective view of the vessel and seal cover.

In the illustrated embodiment, the pressure release passage 45 is defined by an open channel with a semicircular cross section in the seal cover 24 (e.g., FIG. 10). When the seal cover 24 engages the vessel 31, the lip 37 of the vessel forms a bottom wall to the channel to define the passage 45.

In normal operation, an inner oblique surface 46 of the seal cover 24 meets a corresponding inner oblique surface 47 on the lip 37 of the vessel 31. In a similar manner, an outer oblique surface 50 of the seal cover 24 meets and outer oblique surface 51 of the lip 37. Under normally expected operating pressures, these surfaces will remain engaged with one another and provide the necessary seal.

At excessive pressures, however, the vessel 31 will tend to disengage from the seal cover 24 enough to break the sealing relationship between the inner oblique surfaces 46 and 47. This permits gas to reach the pressure release passage 45 and the pressure release openings 33. Based upon the well understood nature of the behavior of gases, the passageway 45 permits the excess pressure to equilibrate quickly as gas escapes from both of the openings 33. Two pressure release openings are shown in FIG. 4, but more could be included (or only one) if desired or necessary.

FIG. 5 illustrates the specific advantage of the retaining ring 25. The retaining ring 25 surrounds the seal cover 24 at the position where the oblique surfaces (46, 47, 50, 51) of the vessel 31 and the seal cover 34 meet. The retaining ring 25 must be strong enough to prevent the outer portions (illustrated at 52) of the seal cover 24 from moving outwardly during pressure release. Stated differently, the retaining ring 25 maintains the outer oblique surfaces 50 and 51 against one another so that when gases escape, they escape only through the pressure release passage 45 and the pressure release openings 33 and not through any undesired opening between the outer oblique surfaces 50 and 51. As illustrated in FIGS. 4 and 5, the retaining ring 25 covers all of the lower portions of the seal cover 24 and extends beyond the lower portions in a direction towards the vessel 31 and the vessel lip 37.

In practice, it has been found appropriate for the retaining ring 25 to have strength on the order of stainless steel and, even in the microwave environment, stainless steel can be used provided it is used in an amount and orientation that prevents arcing or other undesired behavior that metals can exhibit in a microwave field.

The term "stainless steel" is, of course, applied to a wide variety of alloys that are broadly defined as containing a minimum of 10% chromium (by mass). The tensile strength of stainless steels can vary, depending upon the particular alloy and thus as a baseline, the retaining ring according to the present invention can also be described as having (regardless of its composition) a tensile strength of at least about 500 megapascals (MPa).

Other materials are, of course, appropriate, provided that they meet the strength requirements.

It has been found that in the absence of the retaining ring 25 gases will escape between the outer oblique surfaces 50 and 51 frequently resulting in permanent distortion of the vessel rather than a controlled pressure release.

FIG. 6A is a cross-sectional view of the seal cover 24 taken along lines 6-6 of FIG. 4. FIG. 6 illustrates the retaining ring 25 and the pressure release openings 33. FIG. 6 also illustrates the pressure stem seat 40 with the pressure measurement passage 54. As FIGS. 4 and 6 illustrate, the pressure measurement passage 54 extends parallel to the long axis of the seal cover 24, the probe 32, and the vessel 31.

FIG. 6B illustrates the seal cover 24 in a bottom plan view with the elements carrying reference numerals consistent with the other drawings herein.

Monitoring the pressure and temperature during the application of microwave energy provides the opportunity to moderate the application of microwave powers while the reaction proceeds. Typically, but not exclusively, the application of microwaves is moderated or halted when the temperature or pressure reaches certain predetermined values. In many cases the capability for such feedback and control can allow the intended reaction to proceed without interruption before pressures reach an amount that must be vented. The use of processors and related electronic circuits to control instruments based on selected measured parameters (e.g. temperature and pressure) is generally well understood in this and related arts. Exemplary (but not limiting) discussions include Dorf, *The Electrical Engineering Handbook*, Second Ed. (1997) CRC Press LLC As FIGS. 4, 5 and 6 illustrate, the relationship between the seal cover 24 and the retaining ring 25 limits the direction in which the seal cover 24 can move under the influence of pressure from within the vessel 31. Specifically, because the retaining ring 25 prevents distortion in directions radial to the long axis of the vessel 31, such excess pressure will tend to force the seal cover to move parallel to the long axis of the vessel to create the previously described openings between the inner oblique surfaces 46 and 47.

Figure 7:
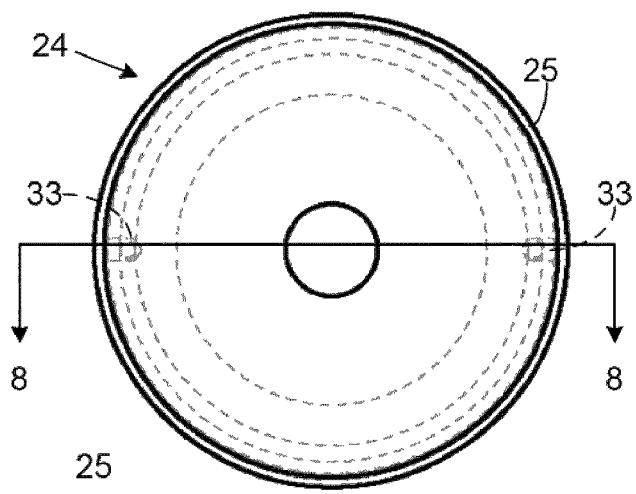
FIG. 7 is a top plan view of a second embodiment of the seal cover according to the invention.
Figure 8:
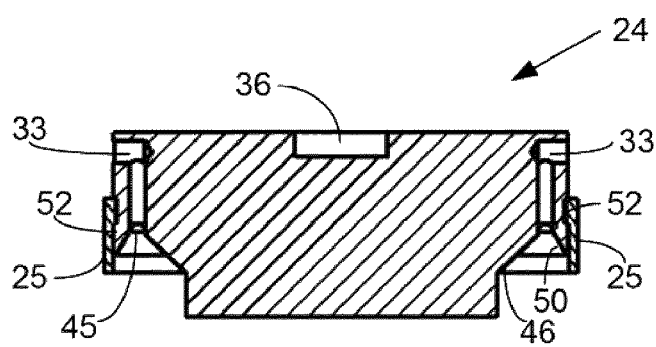
FIG. 8 is a cross-sectional view of a second embodiment of the seal cover taken along lines 8-8 of FIG. 7.
Figure 9:
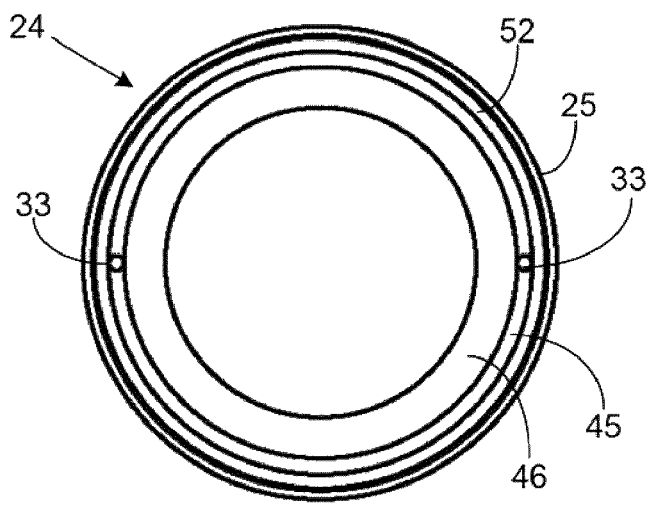
FIG. 9 is a bottom plan view of the second embodiment of the seal cover illustrated in FIGS. 7 and 8.

FIGS. 7, 8 and 9 illustrate the embodiment of the seal cover 24 without the pressure stem seat 40, the pressure stem 41, or the probe 32. As is generally well understood in the field of microwave assisted chemistry, when a plurality of vessels are exposed to microwave radiation in a cavity, and when the vessels are rotating on a turntable, the contents of each vessel generally experiences the same exposure. Thus, it has been observed that if one vessel is monitored under such circumstances, the observed conditions of that vessel will very likely be the same as all of the other vessels in the cavity at the same time. Thus, as FIG. 1 illustrates, the overall complexity of a plurality of vessel systems can be reduced by limiting the monitoring of temperature and pressure to fewer than all of the vessels. In many cases, monitoring a single vessel provides all of the needed information.

As a result, many vessels according to the present invention do not need to include all of the details illustrated in FIGS. 4, 5 and 6. Thus, FIG. 7 is a top plan view of the seal cover 24 and the retaining ring 25.

FIG. 8 is a cross-sectional view taken along lines 8-8 of FIG. 7 again illustrating the seal cover 24 and the retaining ring 25. FIG. 8 also illustrates the pressure release openings 33, the pressure release passage 45, and the respective oblique surfaces 46 and 50 on the seal cover that engage the lip (not shown) of the vessel 31.

FIG. 9 is a bottom plan view of the seal cover illustrated in FIGS. 7 and 8. The inner oblique surface 46 thus is illustrated as a concentric circle as is the retaining ring 25, the outer portions of the vessel 52 and the pressure release passage 45. FIG. 9 thus best illustrates that the pressure release passage 45 forms, in the illustrated embodiment, a circular passageway around the interior of the seal cover 24.

To date, the invention has been used to successfully digest certain materials which have previously been difficult to digest completely based on the pressure and temperature issues described in the background.

Table 1 represents six tests carried out on approximately 300 mg samples of selenium (Se), arsenic (As) and mercury (Hg) metallo-organic standards obtained from High-Purity Standards (Charleston S.C. 29423, USA).

The sample and approximately 10 mL of strong acid (concentrated nitric acid) were placed in a vessel according to the invention. Microwaves were applied in a commercially available instrument (MARS™ System from CEM Corporation, Matthews, N.C., USA) to raise the temperature above 225° C. Following digestion, the reaction products were filtered, prepared, and identified to give the results set forth in Table 1. The selenium and arsenic were analyzed using inductively coupled plasma optical emission spectroscopy (ICP-OES) and the mercury was analyzed using direct mercury analysis (DMA). Because these samples are metallo-organic compounds, complete digestion is required in order to obtain accurate results. Thus, the accuracy of the results obtained using vessels according to the invention provides evidence that complete digestion was taking place. In Table 1 ppm represents micrograms per gram (μm g).

TABLE 1

| 0.300 g | Se ppm | As ppm | Hg ppm |
|---|---|---|---|
| #1 | 47.8 | 48.7 | 49.5 |
| #2 | 50.2 | 49.7 | 50.8 |
| #3 | 51.5 | 48.6 | 50.9 |
| #4 | 51.5 | 49.2 | 49.7 |
| #5 | 53.7 | 48.9 | 50.3 |
| #6 | 54.8 | 49.4 | 49.6 |
| AVG | 51.6 | 49.1 | 50.1 |
| True Value | 50 | 50 | 50 |
| % Recovery | 103% | 98% | 100% |
| Std Dev | 2.47 | 0.45 | 0.63 |
| % RSD | 4.78 | 0.91 | 1.26 |

In other experiments, acetaminophen, Cod liver oil, coal, motor oil, tea leaves, mineral oil, polymers and titanium dioxide were successfully digested at temperatures approaching, and in some cases exceeding 230° C.

In the drawings and specification there has been set forth a preferred embodiment of the invention, and although specific terms have been employed, they are used in a generic and descriptive sense only and not for purposes of limitation, the scope of the invention being defined in the claims.

The invention claimed is:

1. A pressure vessel assembly for high temperature high pressure chemistry comprising:
   a cylindrical vessel defining an open mouth at one end;
   a circumferential vessel lip extending around and transversely from said mouth of said vessel, said vessel lip having respective inner and outer circumferential oblique surfaces;
   a seal cover for engaging and closing said vessel at said mouth, said seal cover having inner and outer circumferential oblique surfaces that respectively engage said oblique surfaces of said vessel lip;
   a circumferential pressure release channel defined by said seal cover at the junction of said oblique surfaces of said seal cover and said vessel lip;
   at least one pressure release opening in said seal cover in communication with said pressure release channel; and
   a retaining ring surrounding said seal cover at the position where said oblique surfaces of said vessel and said seal cover meet that radially urges said seal cover against said vessel lip and prevents distortion of said seal cover in directions radial to the long axis of the vessel.

2. A pressure vessel assembly according to claim 1 formed of materials that are substantially transparent to microwave radiation and wherein said vessel is formed of a material that is also substantially resistant to attack by strong acids.

3. A pressure vessel assembly according to claim 2 further comprising a frame surrounding said vessel and said seal cover for exerting a defined force against said seal cover and said vessel.

4. A vessel assembly according to claim 3 further comprising a reinforcing sleeve around said vessel in said frame.

5. A vessel assembly according to claim 1 wherein said retaining ring has a tensile strength of at least about 500 MPa.

6. A vessel assembly according to claim 5 wherein said retaining ring comprises stainless steel.

7. A vessel assembly for high pressure high temperature chemistry comprising:
   a cylindrical vessel and a cylindrical vessel seal cover;
   said vessel and said seal cover having respective surfaces that, when engaged, define a circumferential interior passage between said vessel and said seal cover;
   a pressure release opening in said seal cover in fluid communication with said circumferential passage; and
   a retaining ring around said vessel and said seal cover at the position where said vessel and said seal cover meet for maintaining an outer circumferential engagement between said seal cover and said vessel when pressure forces gases in said vessel to flow into said circumferential passage and then outwardly from said pressure release opening;
   wherein said retaining ring prevents distortion of said seal cover in directions radial to the long axis of the vessel.

8. A vessel assembly according to claim 7 further comprising a frame for surrounding said vessel and said seal cover and a bolt in said frame for tightening said seal cover against said vessel when said vessel is in said frame.

9. A vessel assembly according to claim 8 further comprising a reinforcing sleeve surrounding said vessel in said frame.

10. A vessel assembly according to claim 9 formed of materials that are substantially transparent to microwave radiation.

11. A vessel assembly according to claim 10 wherein said vessel and said seal cover are formed of a material that is resistant to attack by strong acids.

12. A vessel assembly according to claim 10 wherein said vessel is formed of polytetrafluoroethylene (PTFE).

13. A vessel assembly according to claim 7 wherein said retaining ring has a tensile strength of at least about 500 MPa.

* * * * *